US009652234B2

(12) United States Patent
Caprioli et al.

(10) Patent No.: US 9,652,234 B2
(45) Date of Patent: May 16, 2017

(54) INSTRUCTION AND LOGIC TO CONTROL TRANSFER IN A PARTIAL BINARY TRANSLATION SYSTEM

(75) Inventors: Paul Caprioli, Hillsboro, OR (US);
Martin G. Dixon, Portland, OR (US);
Brett L. Toll, Hillsboro, OR (US);
Muawya M. Al-Otoom, Beaverton, OR (US); Omar M. Shaikh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 695 days.

(21) Appl. No.: 13/996,352

(22) PCT Filed: Sep. 30, 2011

(86) PCT No.: PCT/US2011/054355
§ 371 (c)(1),
(2), (4) Date: Jun. 20, 2013

(87) PCT Pub. No.: WO2013/048460
PCT Pub. Date: Apr. 4, 2013

(65) Prior Publication Data
US 2013/0305019 A1    Nov. 14, 2013

(51) Int. Cl.
*G06F 9/30* (2006.01)
*G06F 9/38* (2006.01)

(52) U.S. Cl.
CPC ........ *G06F 9/30043* (2013.01); *G06F 9/3017* (2013.01); *G06F 9/30174* (2013.01);
(Continued)

(58) Field of Classification Search
CPC . G06F 9/30174; G06F 9/3017; G06F 9/30189
See application file for complete search history.

(56) References Cited

U.S. PATENT DOCUMENTS

| 6,185,669 | B1 * | 2/2001 | Hsu | G06F 9/3808 |
| | | | | 711/118 |
| 6,567,839 | B1 * | 5/2003 | Borkenhagen | G06F 9/3009 |
| | | | | 712/205 |

(Continued)

OTHER PUBLICATIONS

International Search Report and Written Opinion issued on Mar. 2, 2012, for counterpart International Application No. PCT/US2011/054355.

*Primary Examiner* — Yuqing Xiao
(74) *Attorney, Agent, or Firm* — Patent Capital Group

(57) ABSTRACT

A dynamic optimization of code for a processor-specific dynamic binary translation of hot code pages (e.g., frequently executed code pages) may be provided by a run-time translation layer. A method may be provided to use an instruction look-aside buffer (iTLB) to map original code pages and translated code pages. The method may comprise fetching an instruction from an original code page, determining whether the fetched instruction is a first instruction of a new code page and whether the original code page is deprecated. If both determinations return yes, the method may further comprise fetching a next instruction from a translated code page. If either determinations returns no, the method may further comprise decoding the instruction and fetching the next instruction from the original code page.

25 Claims, 14 Drawing Sheets

(52) U.S. Cl.
CPC ........ *G06F 9/30189* (2013.01); *G06F 9/3808* (2013.01); *G06F 9/3877* (2013.01); *G06F 9/3887* (2013.01)

(56) References Cited

U.S. PATENT DOCUMENTS

| | | | |
|---|---|---|---|
| 6,594,734 B1 * | 7/2003 | Kyker | G06F 9/3812 |
| | | | 711/125 |
| 6,678,815 B1 * | 1/2004 | Mathews | G06F 12/0882 |
| | | | 711/137 |
| 7,509,472 B2 * | 3/2009 | Caprioli | G06F 9/30054 |
| | | | 711/204 |
| 8,190,652 B2 * | 5/2012 | Latorre | G06F 12/0875 |
| | | | 707/803 |
| 2004/0122800 A1 | 6/2004 | Nair et al. | |
| 2005/0086451 A1 | 4/2005 | Yates, Jr. et al. | |
| 2006/0149981 A1 * | 7/2006 | Dieffenderfer | G06F 9/30054 |
| | | | 713/320 |
| 2006/0282839 A1 | 12/2006 | Hankins et al. | |
| 2009/0150335 A1 * | 6/2009 | Latorre | G06F 12/1027 |
| 2009/0300323 A1 | 12/2009 | Hessel et al. | |
| 2010/0274972 A1 | 10/2010 | Babayan et al. | |
| 2011/0153307 A1 | 6/2011 | Winkel et al. | |

* cited by examiner

| 127 | 120 119 | 112 111 | 104 103 | | 24 23 | 16 15 | 8 7 | 0 |
|---|---|---|---|---|---|---|---|---|
| bbbb bbbb | bbbb bbbb | bbbb bbbb | • • • | | bbbb bbbb | bbbb bbbb | bbbb bbbb |

UNSIGNED PACKED BYTE REPRESENTATION 344

| 127 | 120 119 | 112 111 | 104 103 | | 24 23 | 16 15 | 8 7 | 0 |
|---|---|---|---|---|---|---|---|---|
| sbbb bbbb | sbbb bbbb | sbbb bbbb | • • • | | sbbb bbbb | sbbb bbbb | sbbb bbbb |

SIGNED PACKED BYTE REPRESENTATION 345

| 127 | 112 111 | | 16 15 | 0 |
|---|---|---|---|---|
| wwww wwww wwww wwww | • • • | | wwww wwww wwww wwww |

UNSIGNED PACKED WORD REPRESENTATION 346

| 127 | 112 111 | | 16 15 | 0 |
|---|---|---|---|---|
| swww wwww wwww wwww | • • • | | swww wwww wwww wwww |

SIGNED PACKED WORD REPRESENTATION 347

| 127 | 92 91 | 32 31 | 0 |
|---|---|---|---|
| dddd dddd dddd dddd dddd dddd dddd dddd | • • • | dddd dddd dddd dddd dddd dddd dddd dddd |

UNSIGNED PACKED DOUBLEWORD REPRESENTATION 348

| 127 | 92 91 | 32 31 | 0 |
|---|---|---|---|
| sddd dddd dddd dddd dddd dddd dddd dddd | • • • | sddd dddd dddd dddd dddd dddd dddd dddd |

SIGNED PACKED DOUBLEWORD REPRESENTATION 349

FIG. 3C

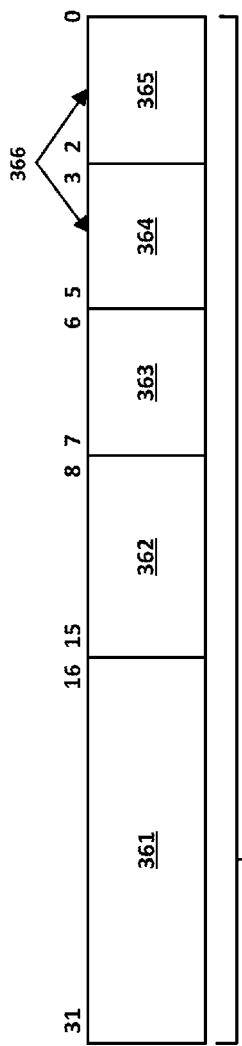
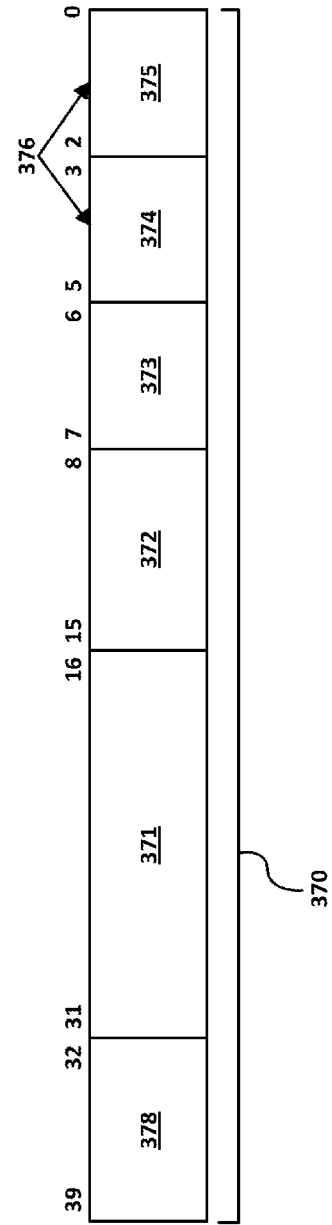
FIG. 3D
FIG. 3E

470

| T | VA | PA | D | |
|---|---|---|---|---|
| ... | ... | ... | | |
| 0 | 0x1000 | 0x40600 | 0 | 480 |
| 0 | 0x2000 | 0x40800 | 1 | 482 |
| 0 | 0x3000 | 0x41000 | 0 | 484 |
| 1 | 0x2000 | 0x41600 | | 486 |
| 1 | 0x3000 | 0x41800 | | 488 |
| ... | ... | ... | | |

INSTRUCTION AND LOGIC TO CONTROL TRANSFER IN A PARTIAL BINARY TRANSLATION SYSTEM

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Computer programs are normally compiled into executables with a specific instruction set for a particular computer processor architecture. This causes a problem for the computer processor venders, independent software vendors (ISVs) and computer operation system vendors (OSVs) because each time a new generation of processors is introduced, these vendors have to spend a lot of engineering resources as well as monetary resources to help to support the old computer programs to run on the new computer processors.

In modern computers, compiled code is typically decoded into microcode by a decoder at the front end of a processor. One existing approach to enable old software to run on new processors is dynamic binary translation that translates the binary code from the original microcode for one instruction set to translated microcode for another instruction set. Because the original microcode is typically stored and looked up using a translation look-aside buffer (TLB) in the front-end of a processor, the existing dynamic binary translation technology creates an extra TLB in addition to the original TLB and uses a translated instruction pointer (IP) added to an original IP to transition from the original microcode to the translated microcode. However, the extra lookup table in the front-end has to be fully searched for every fetch and has area, power, and timing concerns. Further, the extra look up table has to be sized correctly, and therefore has scalability problems as further opportunities for binary translation are discovered. It also introduces architectural complexity regarding allocation and replacement of entries, behavior on context switching etc. Accordingly, there is a need in the art to control transfer of execution from original microcode to the translated microcode.

DESCRIPTION OF THE FIGURES

Embodiments are illustrated by way of example and not limitation in the Figures of the accompanying drawings:

FIG. 3C illustrates packed data types according to one embodiment;

FIG. 3D illustrates an instruction encoding according to one embodiment;

FIG. 3E illustrates an instruction encoding according to one embodiment;

FIG. 4A illustrates an instruction translation look-aside buffer for a partial binary translation system for a micro-architecture according to one embodiment;

DETAILED DESCRIPTION

Figure 1A:
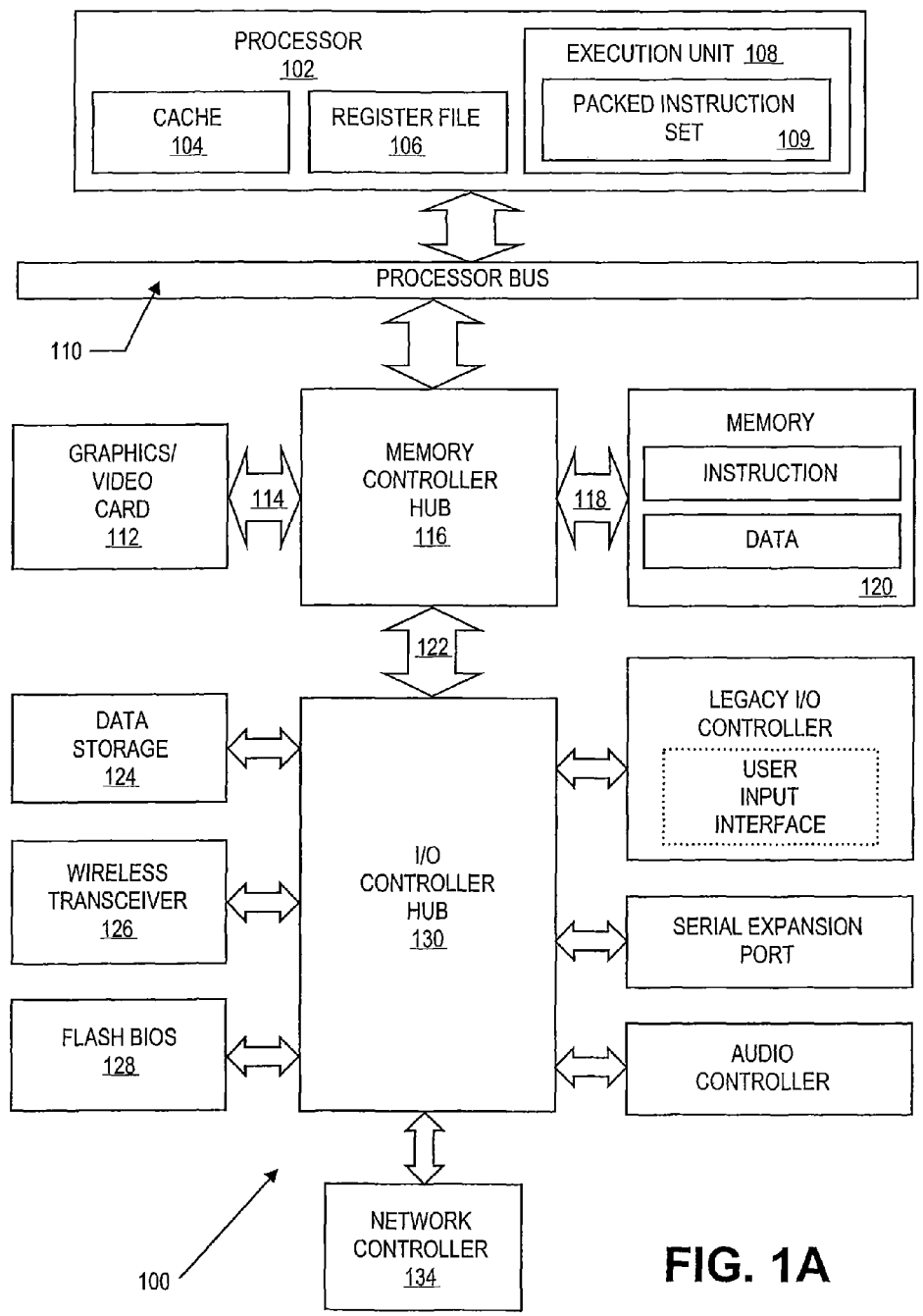
FIG. 1A is a block diagram of a system according to one embodiment.

The following description describes an instruction and processing logic to control transfer in a partial binary translation system within or in association with a processor, computer system, or other processing apparatus. In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be, distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may be a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
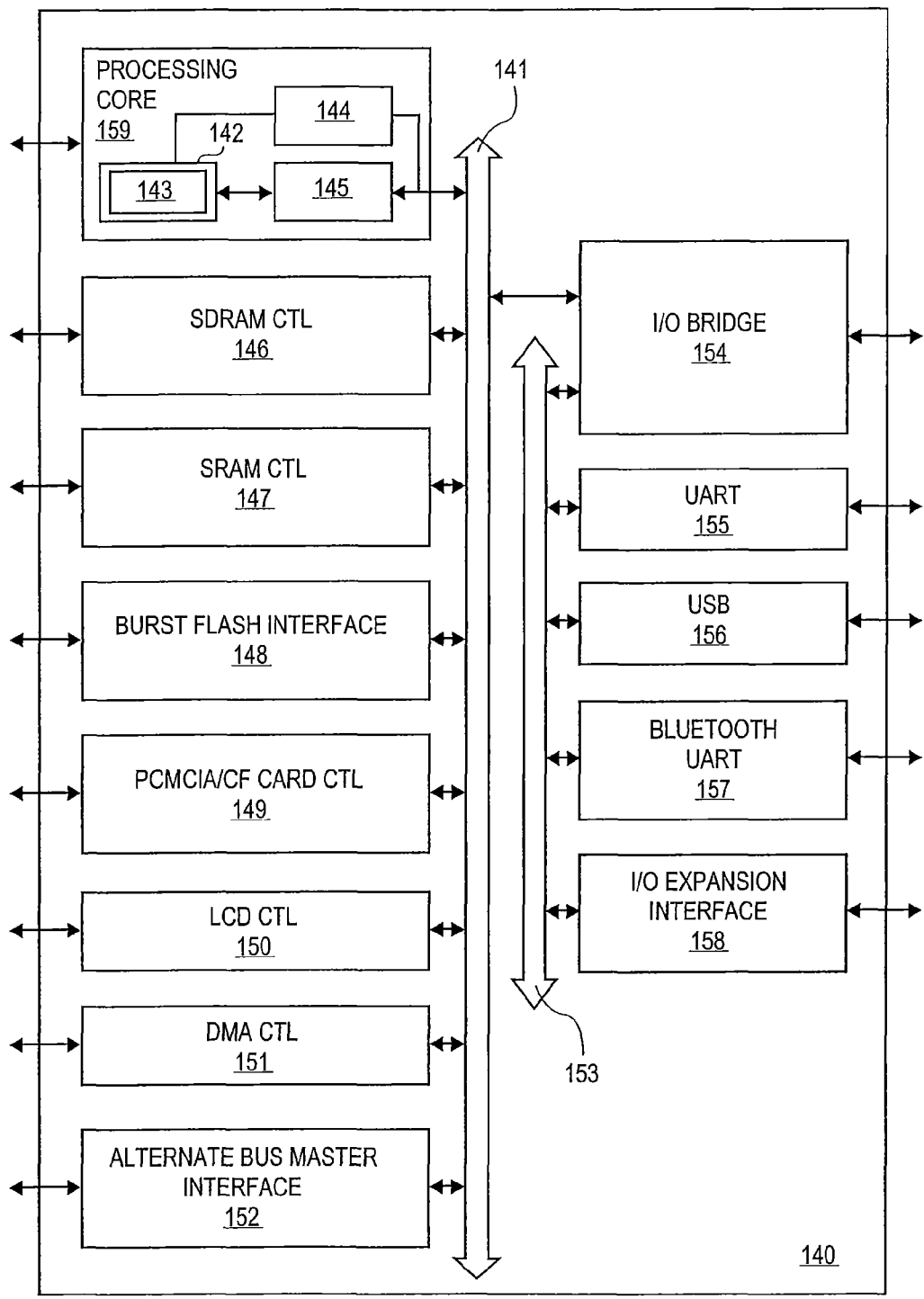
FIG. 1B is a block diagram of a system according to one embodiment.

FIG. 1B illustrates a data processing system 140 which implements the principles of one embodiment of the present invention. It will be readily appreciated by one of skill in the art that the embodiments described herein can be used with alternative processing systems without departure from the scope of embodiments of the invention.

Computer system 140 comprises a processing core 159 capable of performing at least one instruction in accordance with one embodiment. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, to may be suitable to facilitate said manufacture.

Processing core 159 comprises an execution unit 142, a set of register file(s) 145, and a decoder 144. Processing core 159 also includes additional circuitry (not shown) which is not necessary to the understanding of embodiments of the present invention. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the invention and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
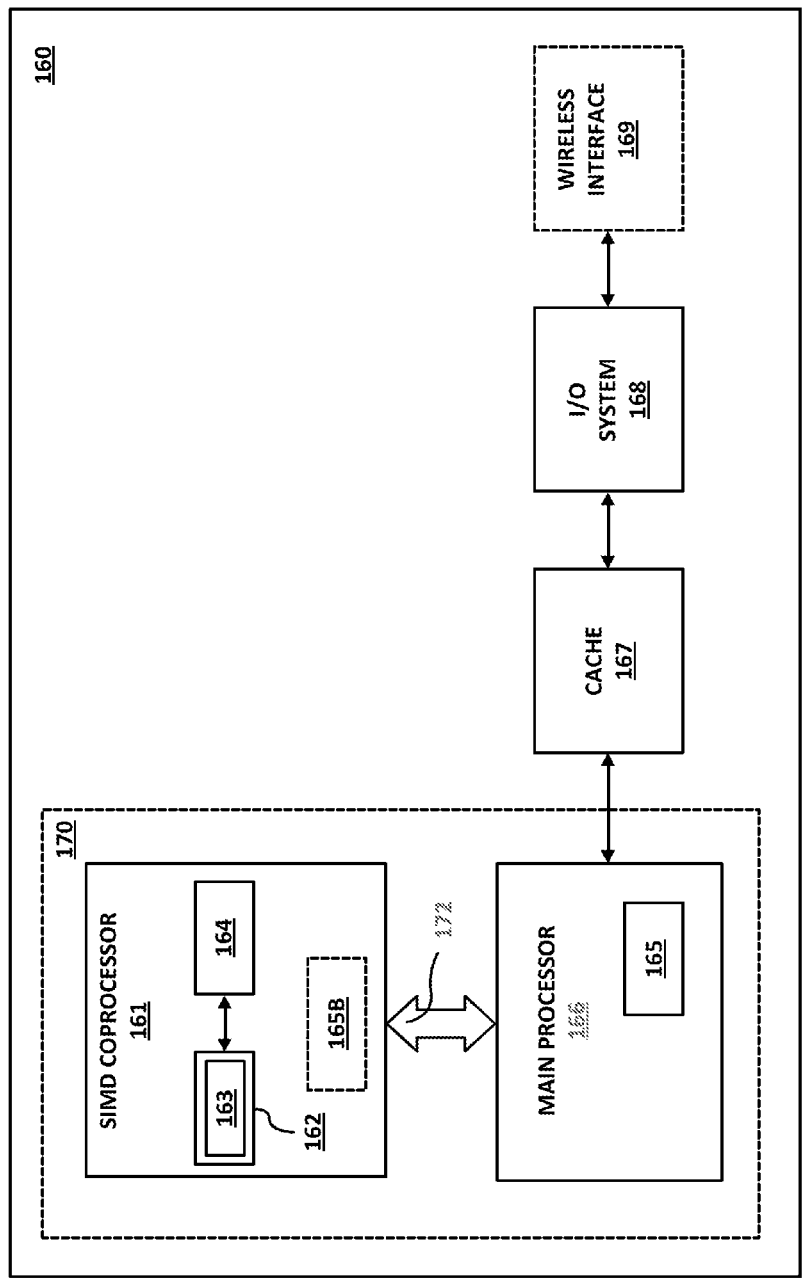
FIG. 1C is a block diagram of a system according to one embodiment.

FIG. 1C illustrates yet alternative embodiments of a data processing system capable of performing SIMD text string comparison operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing operations including instructions in accordance with one embodiment. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including instructions in accordance with one embodiment for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of embodiments of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 172 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including instructions in accordance with one embodiment.

Figure 2:
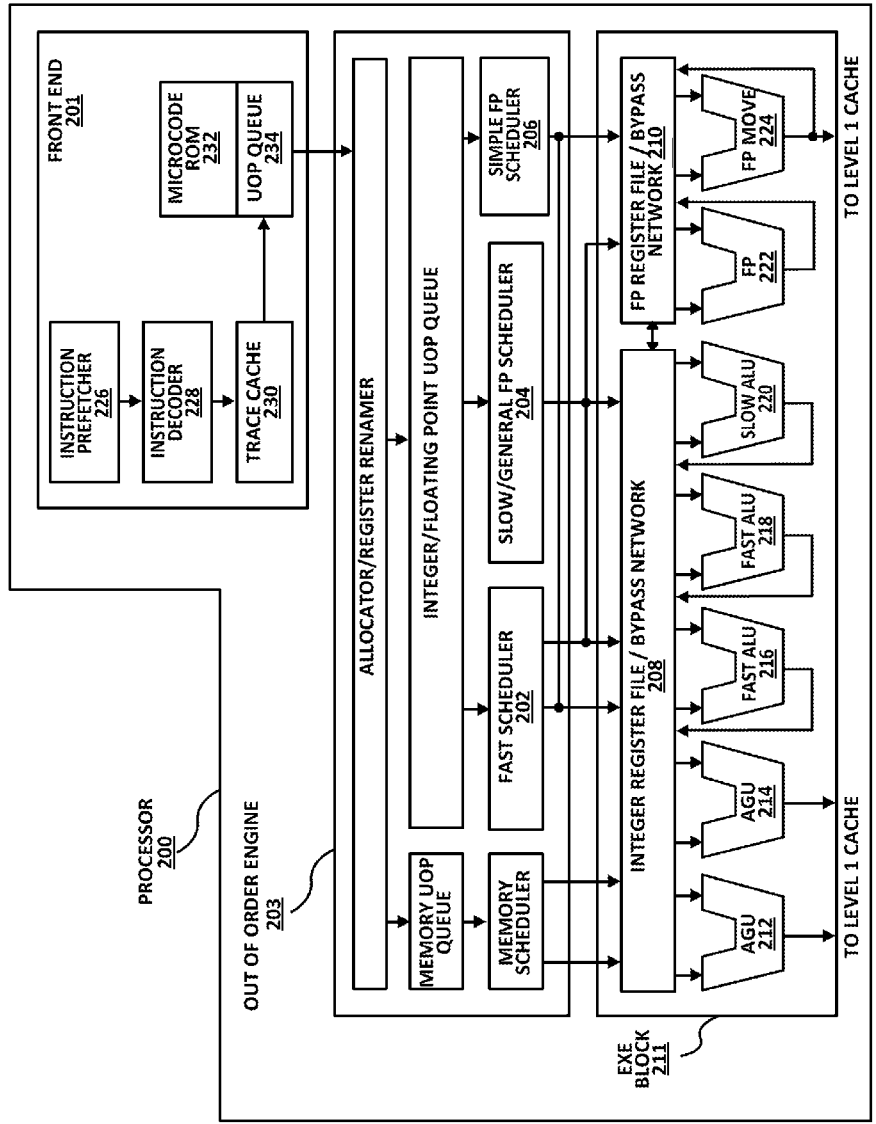
FIG. 2 is a block diagram of a processor according to one embodiment.

FIG. 2 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment, the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete a instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU)

212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3A:
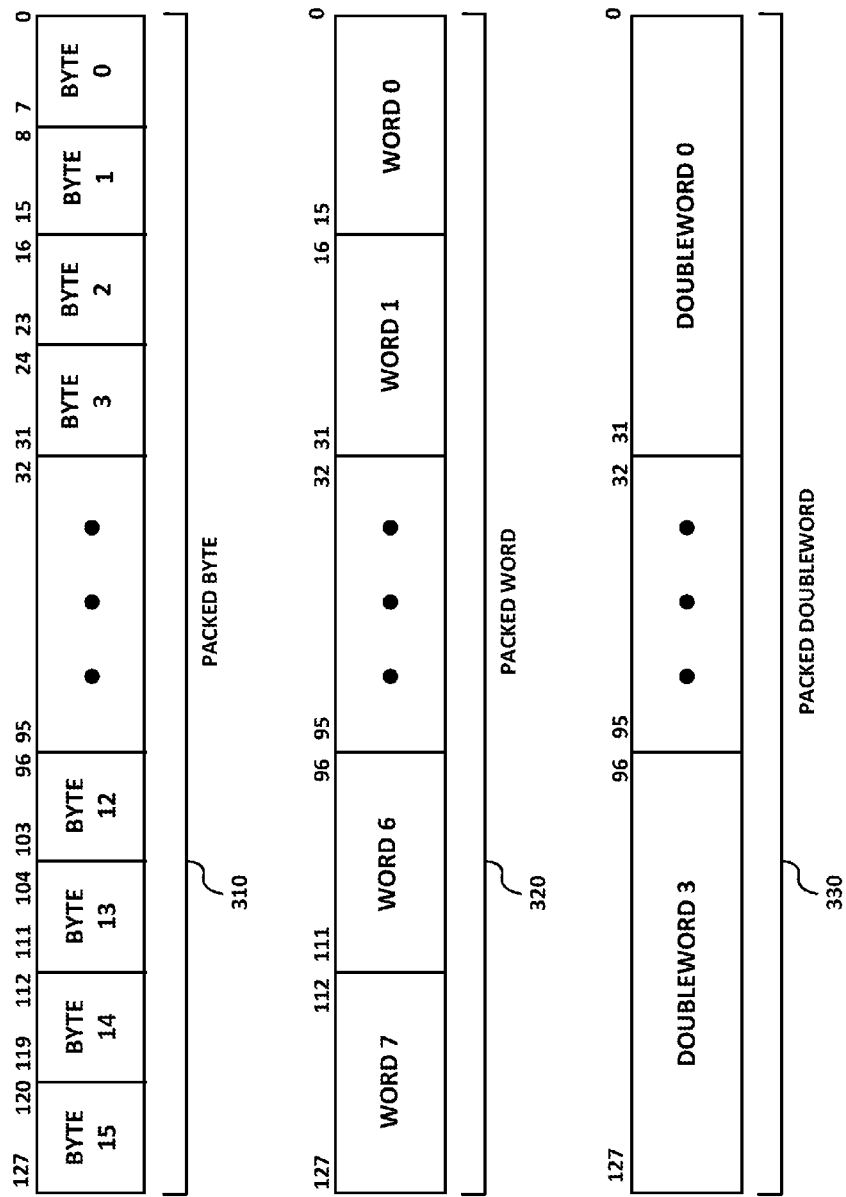
FIG. 3A illustrates packed data types according to one embodiment.

In the examples of the following figures, a number of data operands are described. FIG. 3A illustrates various packed data type representations in multimedia registers according to one embodiment of the present invention. FIG. 3A illustrates data types for a packed byte 310, a packed word 320, and a packed doubleword (dword) 330 for 128 bits wide operands. The packed byte format 310 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, . . . , and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A are 128 bit long, embodiments of the present invention can also operate with 64 bit wide or other sized operands. The packed word format 320 of this example is 128 bits long and contains eight packed word data elements. Each packed word contains sixteen bits of information. The packed doubleword format 330 of FIG. 3A is 128 bits long and contains four packed doubleword data elements. Each packed doubleword data element contains thirty two bits of information. A packed quadword is 128 bits long and contains two packed quad-word data elements.

Figure 3B:
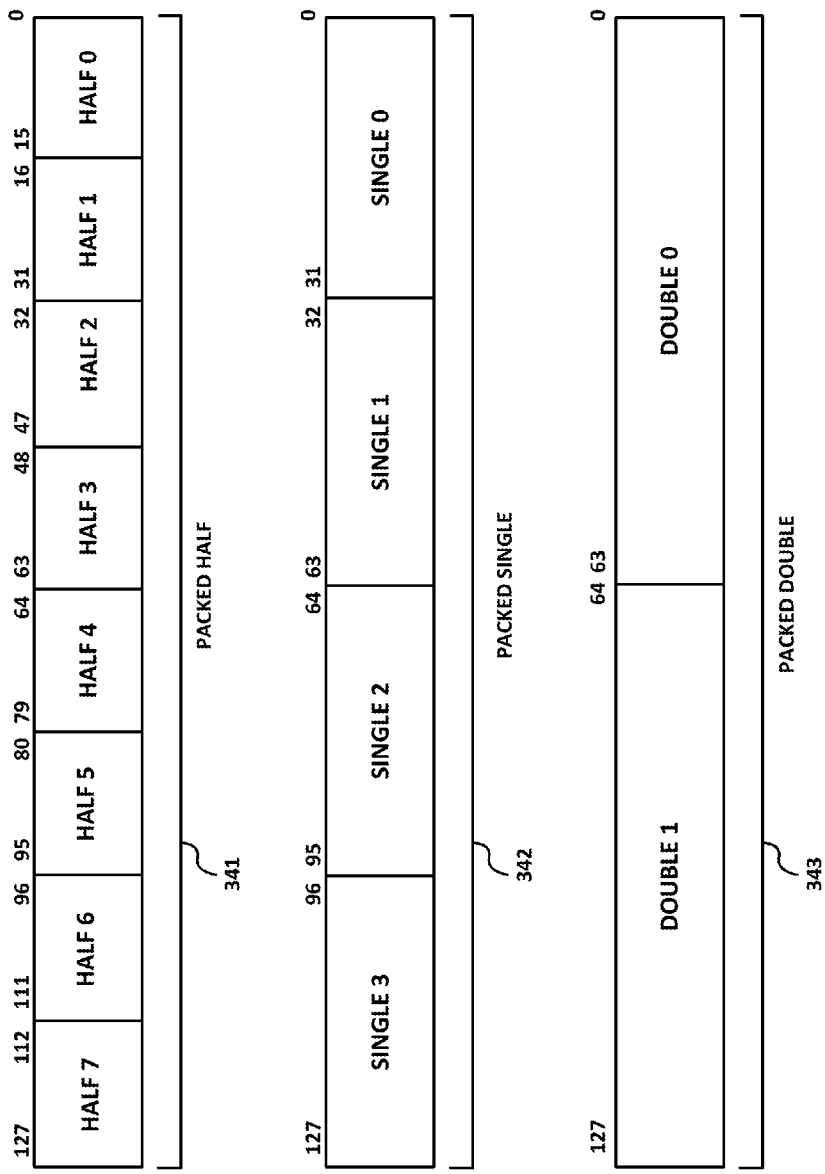
FIG. 3B illustrates packed data types according one embodiment.

FIG. 3B illustrates alternative in-register data storage formats. Each packed data can include more than one independent data element. Three packed data formats are illustrated; packed half 341, packed single 342, and packed double 343. One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers according to one embodiment of the present invention. Unsigned packed byte representation 344 illustrates the storage of an unsigned packed byte in a SIMD register. Information for each byte data element is stored in bit seven through bit zero for byte zero, bit fifteen through bit eight for byte one, bit twenty-three through bit sixteen for byte two, and finally bit one hundred twenty through bit one hundred twenty-seven for byte fifteen. Thus, all available bits are used in the register. This storage arrangement can increase the storage efficiency of the processor. As well, with sixteen data elements accessed, one operation can now be performed on sixteen data elements in a parallel fashion. Signed packed byte representation 345 illustrates the storage of a signed packed byte. Note that the eighth bit of every byte data element is the sign indicator. Unsigned packed word representation 346 illustrates how word seven through word zero are stored in a SIMD register. Signed packed word representation 347 is similar to the unsigned packed word in-register representation 346. Note that the sixteenth bit of each word data element is the sign indicator. Unsigned packed doubleword representation 348 shows how doubleword data elements are stored. Signed packed doubleword representation 349 is similar to unsigned packed doubleword in-register representation 348. Note that the necessary sign bit is the thirty-second bit of each doubleword data element.

FIG. 3D is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. For one embodiment, destination operand identifier 366 is the same as source operand identifier 364, whereas in other embodiments they are different. For an alternative embodiment, destination operand identifier 366 is the same as source operand identifier 365, whereas in other embodiments they are different. In one embodiment, one of the source operands identified by source operand identifiers 364 and 365 is overwritten by the results of the text string comparison operations, whereas in other embodiments identifier 364 corresponds to a source register element and identifier 365 corresponds to a destination register element. For one embodiment, operand identifiers 364 and 365 may be used to identify 32-bit or 64-bit source and destination operands.

FIG. 3E is a depiction of another alternative operation encoding (opcode) format 370, having forty or more bits. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. For one embodiment, prefix byte 378 may be used to identify 32-bit or 64-bit source and destination operands. For one embodiment, destination operand identifier 376 is the same as source operand identifier 374, whereas in other embodiments they are different. For an alternative embodiment, destination operand identifier 376 is the same as source operand identifier 375, whereas in other embodiments they are different. In one embodiment, an instruction operates on one or more of the operands identified by operand identifiers 374 and 375 and one or more operands identified by the operand identifiers 374 and 375 is overwritten by the results of the instruction, whereas in other embodiments, operands identified by identifiers 374 and 375 are written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Figure 3F:
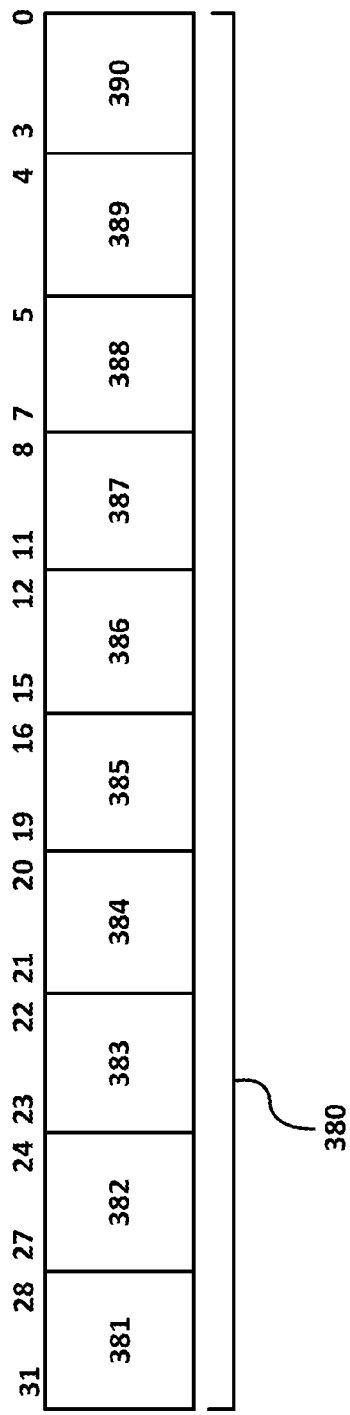
FIG. 3F illustrates an instruction encoding according to one embodiment.

Turning next to FIG. 3F, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments, operations may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, an instruction is performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection can be done on SIMD fields. For some instructions, the type of saturation may be encoded by field 384.

FIG. 4A illustrates an instruction translation look-aside buffer (iTLB) 470 for a partial binary translation system for a micro-architecture according to one embodiment. The iTLB 470 may comprise a first column 472 to store a bit (T bit), a second column 474 to store virtual address, a third column 476 to store physical address mapped to the virtual address and a fourth column 478 to store another bit (D bit). The T bit may indicate whether an underlying code page pointed to by the physical address is an original code page containing original code (e.g., originally compiled software instructions or a translated code page containing translated code (e.g., optimized by a translator or code optimizer). In one embodiment, T=0 may mean the underlying code page is an original code page, T=1 may mean the underlying code page is a translated code page. The D bit may indicate whether an instruction pointed to by the physical address is deprecated. For example, D=0 may indicate the instruction is not deprecated and D=1 may indicate the instruction is deprecated.

The iTLB 470, for example, may illustrate that, in a row 480, a virtual address "0x1000" may map to a physical address "0x40600." The T bit and D' bit of the row 480 may indicate the instruction at the physical address "0x40600" may be original code and not deprecated. In row 482 of the iTLB 470, a virtual address "0x2000" may be mapped to a physical address of "0x40800." The T bit of the row 482 may indicate that the physical address "0x40800" may be an original code page but the D bit of the row 482 may indicate that the instruction stored at this physical address may be deprecated. In row 484 of the iTLB 470, a virtual address "0x3000" may be mapped to a physical address of "0x41000." The T bit and D bit of the row 484 may indicate that the physical address "0x41000" may be an original code page and not deprecated. In row 486 of the iTLB 470, a virtual address "0x2000" may be mapped to a physical address of "0x41600." The T bit of the row 486 may indicate that the physical address "0x41600" may be a translated code page. In row 488 of the iTLB 470, a virtual address "0x3000" may be mapped to a physical address of "0x41800." The T bit of the row 488 may indicate that the physical address "0x41800" may be a translated code page. For the rows 486 and 488, the D bits may have no meaning for any translated code pages, and thus are empty.

As illustrated in the iTLB 470, for a deprecated instruction pointed to by a virtual address, a translated code page may be allocated to store the corresponding translated instruction. Thus, the virtual address "0x2000" may map to a physical address "0x40800" that may store an instruction marked as deprecated and another physical address "0x41600" that may store a corresponding translated instruction.

In one embodiment, the translated code page may contain non-translated instructions before and/or after the translated instructions to keep the translated instructions in a context parallel to the original code page.

Figure 4B:
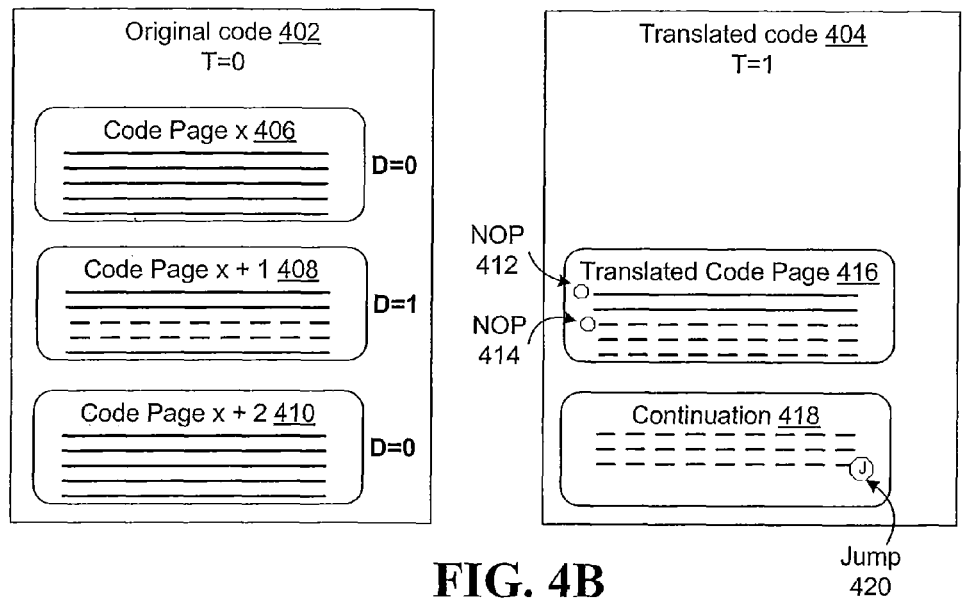
FIG. 4B illustrates the layout of pages of code in memory for a partial binary translation system for a micro-architecture according to one embodiment

FIG. 4B illustrates the layout 400 of pages of code in memory for a partial binary translation system for a microarchitecture according to one embodiment. As described above, a front end decoder may receive each instruction of the compiled code, decode the instruction and queue up uops. Some or all of these instructions may be stored in code pages. An iTLB (e.g., the iTLB 470) may be used to cache page table entries that map virtual addresses to physical addresses. The code pages may be either on or off a processor chip in memory and/or various levels of the cache hierarchy (possibly including the first level instruction cache). A partial binary translation according to one embodiment may generate processor-specific optimized code for a frequently executed portion of binary code. As shown in FIG. 4B, the layout 400 of code pages may comprise a first portion of code pages 402 and a second portion of code pages 404. The first portion of code pages 402 may store the original code (e.g., originally compiled software instructions). The first portion of code pages 402 may comprise a plurality of code pages, for example, the code pages 406, 408 and 410. Each code page in the first portion of code pages may be tagged (e.g., in the iTLB such as the iTLB 470) to identify whether the code page has been translated by a translator. The second portion of code pages 404 may be used by a translator (e.g., a code optimizer) to store code pages for translated code in a context parallel to the original code. In one embodiment, the translated code page may be larger than the original code page, for example, as shown in FIG. 4B, the first four lines of the original code page 408 may be translated into the translated code pages 416 and 418. In various embodiments, the first and second portion of code pages 402 and 404 may be located in a common cache or from different caches.

Not all code of the original code page 408 is translated by the translator, thus, as shown in FIG. 4B, the third and fourth lines of code of the original code page 408 (shown in dashed lines) may be identified as a frequently executed portion of the original code and may be translated. The corresponding translated code may be indicated as dashed lines in the translated code pages 416 and page 418. The first two solid lines of the translated code page 416 may be copied from the original code page 408.

When the original code page 408 is translated, two unique uops 412 and 414 may be placed into the translated code page 416. The first unique uop 412 may be placed as the first instruction for the translated code page 416. The second unique uop 414 may be placed as the first instruction for the portion of the translated code. In one embodiment, each of the unique uops may be a uniquely identifiable NOP (e.g., a two byte unique code), and the NOP may be squashed by the decoder—it need not be executed.

The translated code page may contain a jump instruction at the end of the translated code. For example, the continuation page 418 for the translated code may have a jump instruction 420 at the end of the translated code. The jump instruction 420 may be a new instruction, jOriginalCode. When a jump instruction 420 is encountered, the execution of the code may jump back from the translated code page to the original code page. That is, the next instruction to be retrieved by a decoder may be the first instruction of the fifth line of the original code page 408 from the original code page 408.

In another embodiment, as indicated by rows 484 and 488 of the iTLB 470, the remaining code of the original code page after the portion of the original code to be translated may also be copied to the translated code page and appended after the portion of the translated code. That is, for example, the fifth line of the original code page 408 may be copied and appended in the continuation page 418 after the translated code. In this embodiment, the jump instruction 420 may be placed after the fifth line of the original code copied to the continuation page 418. Thus, in this particular embodiment, after the translated code of the continuation page 418 may be fetched and decoded, the next instruction to be retrieved by the decoder may be the first instruction of the fifth line of the original code page 408 copied to the continuation page 418. The transitioning back to the original code may be delayed until the fifth line of the original code page 408 may be fetched and executed from the continuation page 418.

In one embodiment, as shown in FIG. 4A, two bits may be added to the iTLB 470: a tag bit to indicate the context (whether it is original code page (T=0) or translated code page (T=1)) and a data bit to indicate whether the code page is deprecated (D=1 for deprecated and D=0 for non-deprecated). Thus, all code pages in the first portion of code pages 402 may have T=0 and all code pages in the second portion of code pages 404 may have T=1. When a page is translated, the original page (T=0) may be marked as deprecated (D=1). For example, code page 408 of the first portion of code pages 402 may be translated and may be marked as deprecated (D=1), while code pages 406 and 410 are not translated and marked as not deprecated (D=0).

Figure 4C:
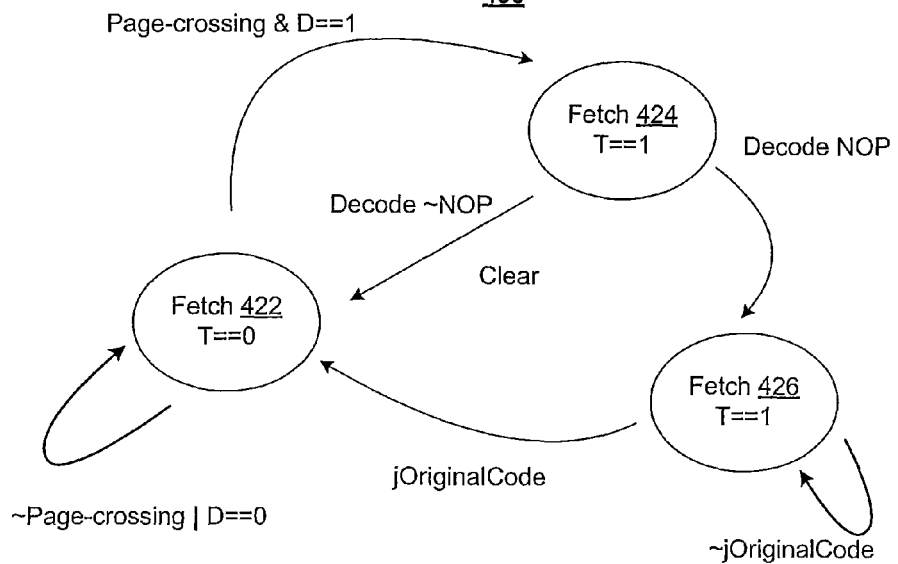
FIG. 4C illustrates a state machine according to one embodiment.

FIG. 4C illustrates a state machine 430 according to one embodiment. When a fetch 422 is performed, an instruction may be fetched from an original code page with T being 0 (T=0). If the fetch is not a page-crossing fetch (e.g., fetching the first instruction of a new code page), or the code page is not marked as deprecated (D is not 0), the fetched instruction may be decoded and another fetch 422 may be performed for a next instruction from the original code page.

When a page-crossing fetch for a code page of T being 0 is performed, and a deprecated page (D is 1) is returned by the iTLB 470, the iTLB 470 may be looked-up again using T=1. That is, the state machine 430 may transition from the fetch 422 to the fetch 424 to retrieve a next instruction from a translated code page in the context parallel to the original code page. Upon transitioning from T=0 to T=1, the first instruction fetched by the fetch 424 must be a uniquely identifiable NOP. If this is not found, the decoder may signal a re-fetch (e.g., the Clear signal) to the front-end fetch unit, which resumes fetching with T=0 (jump back to fetch 422). This may prevent the possibility of an unexpected jump from original code into the middle of a translated region (possibly into the middle of a instruction). In one embodiment, the translation software (e.g., a translator) may be responsible to ensure that the bit pattern representing this unique NOP appears only at legitimate entry points in the translated code (e.g., the first instruction 412 of the translated code page, or the first instruction 414 of the translated frequently executed code.

When the fetch 424 verifies the first instruction is a unique identifier NOP, the state machine may transition to the fetch 426. The fetch 426 may be executed for all code in the translated code page. Exiting from a translated code page back to an original (T=0) code page may be accomplished by the new jump instruction, jOriginalCode. Therefore, as long as the jOriginalCode instruction is not encountered, the fetch 426 may be repeated. In one embodiment, the jOriginalCode may be encoded using an instruction prefix to existing branch instructions.

The iTLB 470 shown in FIG. 4A may illustrate an example iTLB for the code pages shown in FIG. 4B, in which physical code pages 406 and 410 are not translated and physical code page 408 is translated. As shown in FIG. 4B, before the code translation (e.g., optimization), the program may starts running at the virtual address "0x1000," which may map to the physical address "0x40600." As program moves along, the virtual address may increase. When the program gets to the virtual address "0x2000," the physical address may be mapped to the physical address "0x40800."

After the code translation, the program may still start running at the virtual address "0x1000," which still maps to "0x40600." As the program moves along, the virtual address may increase. When the program gets to the virtual address "0x2000," the instruction(s) stored at this address may be marked as deprecated, so an microprocessor according to an embodiment may start using T=1. Now, the virtual address "0x2000" may map to the physical address "0x41600." As the moves along, the virtual address in the translated code may increase. When the program gets to the virtual address "0x3000," the program may be still running the translated code (e.g., it's still in T=1 mode), so the virtual address may map to 41800. As the program moves along, the virtual address may further increase. Suppose that the translated code at virtual address "0x3888" contains the instruction "JOriginal 3000," then, when the program executes to the instruction at the virtual address "0x3888," the microprocessor may simultaneously set the virtual address to "0x3000" and set T back to 0. Now the program may start running at the virtual address "0x3000" of T=0, which may be mapped to the physical page "0x41000," as shown in FIG. 4A.

In one embodiment, the first and second portion of code pages 402 and 404 may be two page tables. The use of the page tables to identify translated code or re-optimized code may simplify the front end hardware. The use of page tables may also allow the original code to remain both readable and executable. As described above, the original code may be still present in its original context space of T=0, while the translated code may exist in a parallel context T=1. In one embodiment, the partial binary translation may be performed at the granularity of a code page, e.g., 4 KB.

In one embodiment, the original physical code page may be marked non-writable to handle the possibility of self-modifying or cross-modifying code. Furthermore, the fact that original code pages that have been translated are marked as deprecated (D=1) can be utilized to signal the binary translation run-time that it needs to invalidate the translation code cache. For example, a DMA engine that writes to a page marked D=1 could allow the DMA to proceed (as such transactions cannot be aborted and re-started) and notify the translation run-time that the previous translation is no longer valid.

In one embodiment, a parallel context into which the translator can store code pages may provide virtual address space for optimized (translated) code. This may allow the translated code to be statically larger than the original code without having to search the original virtual address space for a suitable unused region. For example, as shown in FIG. 4B, the translated code in the translated code page 416 and the continuation page 418 (totally six dashed lines) may be larger than the original code in the original code page 408 (two dashed lines).

The iTLB according to one embodiment may provide a mechanism by which the processor can recognize that a section of code has been optimized and automatically transfer control both to and from the translated code. The transfer control provided by the iTLB may improve performance by not resorting to trapping a runtime software layer and may be accomplished with a minimum added area and power.

Figure 4D:
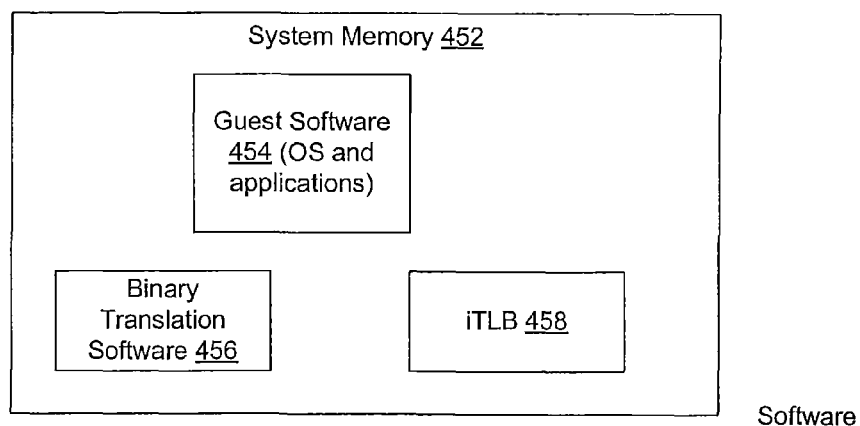
FIG. 4D illustrates elements of a dynamic binary translation system for a micro-architecture according to one embodiment.
Figure 4D:
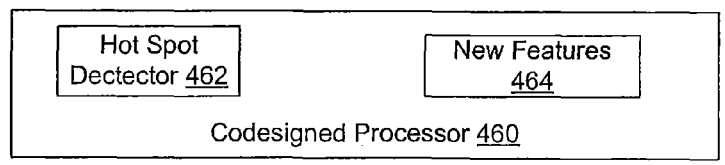

FIG. 4D illustrates elements of a hardware and software co-designed dynamic binary translation system for a micro-architecture according to one embodiment. As shown in FIG. 4D the software may include a system memory 452, which may comprise guest software 454, binary translation software 456, and iTLB 458. The binary translation software 456 and iTLB 458 may be software elements of a micro-architecture 450 according to the present invention. The micro-architecture 450 may further include a co-designed processor 460 that may comprise a hot spot detector 462 and new features 464. In one embodiment, the guest software 454 may be compiled using a specific instruction set and may be an OS or any other software running on the OS (including another OS running on a virtual machine that is managed by a virtual machine manager).

The hot spot detector 462 may include a performance monitoring unit (PMU) that detects hot spot in the original code. The new features 464 may include features provided by a new generation of processors, for example, the new features may include wider registers (such as, 256 bits, 512 bits or 1024 bits, etc), and other features (e.g., circuitry to enter and exit translated code, circuitry to ensure translation consistency, circuitry for memory disambiguation, circuitry for an atomicity support, circuitry for the runtime monitoring ucode). The binary translation software 456 of the micro-architecture 450 may include logic to analyze the hot spot of the original code, logic to identify frequently executed portion of the original code, a translator that translates the identified frequently executed portion of the original code to translated code to instructions provided by the underlying processor, and a runtime to execute (including transition between) the original code and translated code.

Figure 5:
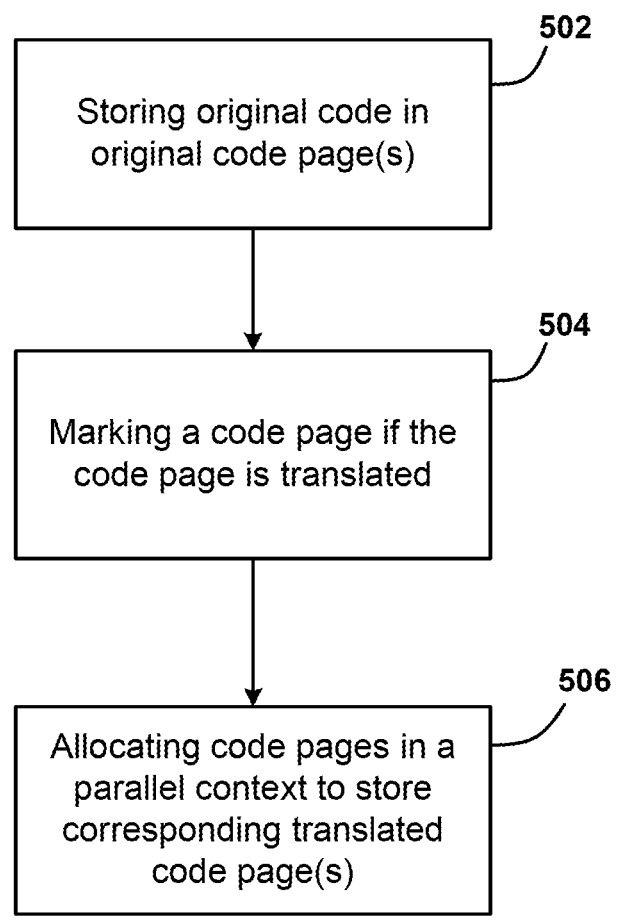
FIG. 5 illustrates a flow diagram for operations to be performed according to one embodiment.

FIG. 5 illustrates a flow diagram 500 for operations to be performed according to one embodiment. At block 502, original code may be stored in original code page(s). Each original code page may be tagged, for example, by setting a tag bit T=0, to identify it as an original code page. At block 504, a code page may be marked if the code page is translated. In one embodiment, as described above, the code page being translated may be marked by setting a data bit D=1 to indicate the page is deprecated. At block 506, the translated code page(s) may be allocated in a context parallel to the original code pages to store the corresponding translated code page(s). The translated code page may comprise unique identifiers to identify the page entry and the code entry for the translated code (e.g., NOPs 412 and 414 in the translated code page 416). In one embodiment, one or more steps illustrated by the flow diagram 500 may be performed by translation software (e.g., a code optimizer) of a micro-architecture that implements dynamic partial binary translation.

Figure 6:
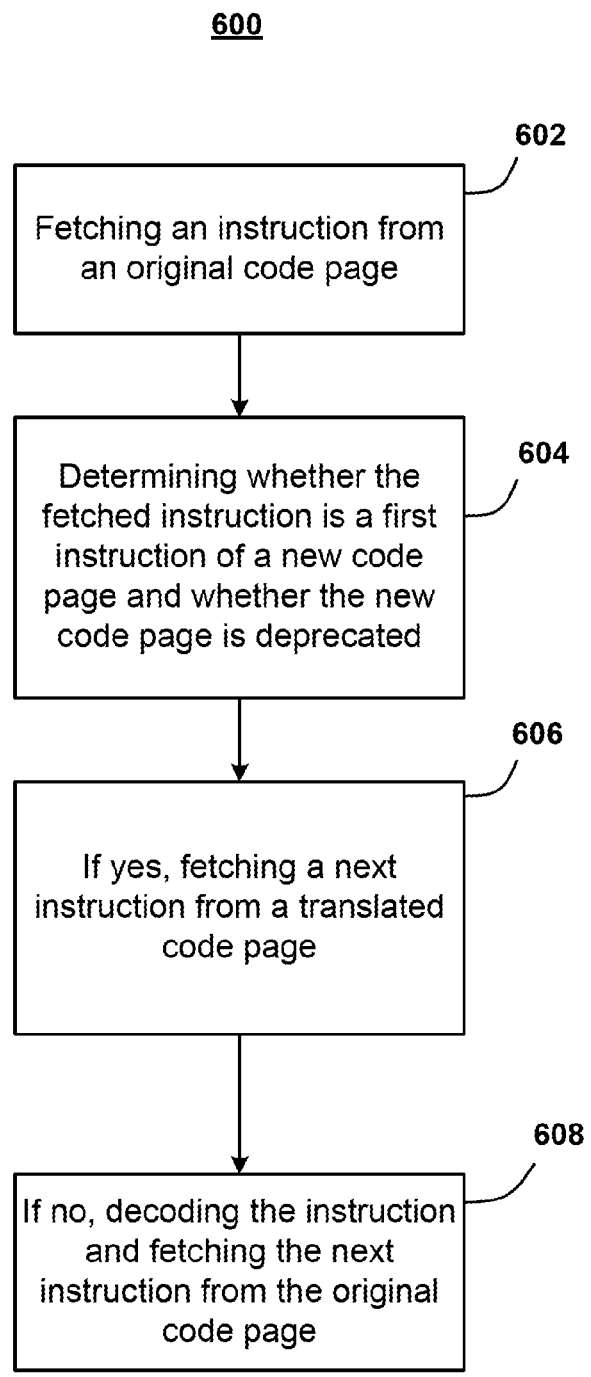
FIG. 6 illustrates another flow diagram for operations to be performed according to one embodiment.

FIG. 6 illustrates another flow diagram for operations to be performed according to one embodiment. At block 602, an instruction may be fetched from an original code page. In one embodiment, the original code page may be tagged by a tag bit T and T=0 may indicate the code page is an original code page. At block 604, whether the fetched instruction is a first instruction of a new code page (e.g., page-crossing) and whether the new code page is deprecated may be determined. At block 606, if the fetched instruction is a first instruction of a new code page and the new code page is deprecated, a next instruction may be fetched from a translated code page. For example, as shown in the state machine of FIG. 4C, if an instruction fetched by a fetch 422 indicates a page crossing to a deprecated page, a fetch 424 may be performed next, and the fetch/execution may be continued in the translated code page. If the fetch 424 returns a NOP; the fetch/execution may continue for the translated code page until a jump instruction (e.g., jOriginalCode) may be encountered. If the fetch 424 returns an instruction other than the NOP, the fetch/execution may transition back to the original code page. At block 608, if the fetched instruction is not a first instruction of a new code page or the code page is not a deprecated code page, the next instruction may be fetched from the original code page. In one embodiment, one or more steps illustrated by the flow diagram 600 may be performed by runtime software of a micro-architecture that implements dynamic partial binary translation.

Embodiments of the present invention may provide dynamic optimization of code by a run-time translation layer for a processor-specific dynamic binary translation of hot code pages (e.g., frequently executed code pages). One embodiment may provide a method to use an iTLB to map original code pages and translated code pages. The method may comprise fetching an instruction from an original code page, determining whether the fetched instruction is a first instruction of a new code page and whether the original code page is deprecated. If the fetched instruction is a first instruction of a new code page and the original code page is deprecated, the method may further comprise fetching a next instruction from a translated code page. If the fetched instruction is not a first instruction of a new code page or the original code page is not deprecated, the method may further comprise decoding the instruction and fetching the next instruction from the original code page.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Thus, techniques for performing one or more instructions according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A method comprising:
    fetching instructions from code pages;
    referring to an instruction look-aside buffer (iTLB) to determine whether any particular code page is original; and
    for every instruction fetched from an original code page:
        determining whether the fetched instruction is a first instruction of a new code page of original code,
        referring to the iTLB to determine whether the original code page is deprecated by a translated code page;
        when the fetched instruction is a first instruction of a new code page and the original code page is deprecated, fetching a next instruction from the translated code page; and when the fetched instruction is not a first instruction of a new code page or the original code page is not deprecated, decoding the instruction and fetching the next instruction from the original code page.

2. The method of claim 1, wherein the original code page and the translated code page are mapped by the instruction look-aside buffer (iTLB).

3. The method of claim 2, wherein the translated code page is stored in a context parallel to a context of the original code page.

4. The method of claim 2, wherein the iTLB has a tag bit for each code page to indicate whether a code page is an original code page or translated code page.

5. The method of claim 4, wherein the iTLB has a data bit for each original code page to indicate whether an original code page is deprecated or not, and wherein the data bit and the tag bit are stored in the iTLB as separate bits.

6. The method of claim 1, wherein each translated code page comprises a first unique identifier at a page entry and a second unique identifier at an entry point to a portion of translated code.

7. The method of claim 6, wherein the first and second unique identifiers are NOP instructions to be squashed by a decoder.

8. The method of claim 7, further comprising:
determining whether the next instruction fetched from the translated code page is a NOP instruction;
when the next instruction fetched from the translated code page is determined to be a NOP instruction, continuing fetching instructions from the translated code page until a jump instruction to transition back to the original code page; and
when the next instruction fetched from the translated code page is determined not to be a NOP instruction, resuming fetching from the original code page.

9. A processor comprising:
circuitry to store instructions in code pages;
logic to fetch instructions from the code pages;
logic to determine whether any particular code page is original by referring to an instruction look-aside buffer (iTLB); and
logic to, for every instruction fetched from an original code page:
determine whether the fetched instruction is a first instruction of a new code page of original code;
refer to the iTLB to determine whether the original code page is deprecated by a translated code page;
upon determining that the fetched instruction is a first instruction of a new code page and the original code page is deprecated, fetch a next instruction from the translated code page; and
upon determining that the fetched instruction is not a first instruction of a new code page or the original code page is not deprecated, decode the instruction and fetch the next instruction from the original code page.

10. The processor of claim 9, wherein the original code page and the translated code page are mapped by the instruction look-aside buffer (iTLB).

11. The processor of claim 10, wherein the translated code page is stored in a context parallel to a context of the original code page.

12. The processor of claim 10, wherein the iTLB has a tag bit for each code page to indicate whether a code page is an original code page or translated code page.

13. The processor of claim 12, wherein the iTLB has a data bit for each original code page to indicate whether an original code page is deprecated or not, and wherein the data bit and the tag bit are stored in the iTLB as separate bits.

14. The processor of claim 9, wherein each translated code page comprises a first unique identifier at a page entry and a second unique identifier at an entry point to a portion of translated code.

15. The processor of claim 14, wherein the first and second unique identifiers are NOP instructions to be squashed by a decoder.

16. The processor of claim 15, further comprising:
logic to determine whether the next instruction fetched from the translated code page is a NOP instruction;
logic to, when the next instruction fetched from the translated code page is determined to be a NOP instruction, continue fetching instructions from the translated code page until a jump instruction to transition back to the original code page; and
logic to, when the next instruction fetched from the translated code page is determined not to be a NOP instruction, resume fetching from the original code page.

17. A system comprising:
a storage to store instructions; and
a processor to execute the instructions to perform a method comprising:
fetching instructions from code pages;
referring to an instruction look-aside buffer (iTLB) to determine whether any particular code page is original; and
for every instruction fetched from an original code page:
determining whether the fetched instruction is a first instruction of a new code page of original code;
referring to the iTLB to determine whether the original code page is deprecated by a translated code page;
when the fetched instruction is a first instruction of a new code page and the original code page is deprecated, fetching a next instruction from the translated code page; and
when the fetched instruction is not a first instruction of a new code page or the original code page is not deprecated, decoding the instruction and fetching the next instruction from the original code page.

18. The system of claim 17, wherein the original code page and the translated code page are mapped by the instruction look-aside buffer (iTLB).

19. The system of claim 18, wherein the translated code page is stored in a context parallel to a context of the original code page.

20. The system of claim 18, wherein the iTLB has a tag bit for each code page to indicate whether a code page is an original code page or translated code page.

21. The system of claim 20, wherein the iTLB has a data bit for each original code page to indicate whether an original code page is deprecated or not, and wherein the data bit and the tag bit are stored in the iTLB as separate bits.

22. The system of claim 17, wherein each translated code page comprises a first unique identifier at a page entry and a second unique identifier at an entry point to a portion of translated code.

23. The system of claim 22, wherein the first and second unique identifiers are NOP instructions to be squashed by a decoder.

24. The system of claim 23, wherein the method further comprises:

determining whether the next instruction fetched from the translated code page is a NOP instruction;

when the next instruction fetched from the translated code page is determined to be a NOP instruction, continuing fetching instructions from the translated code page until a jump instruction to transition back to the original code page; and when the next instruction fetched from the translated code page is determined not to be a NOP instruction, resuming fetching from the original code page.

25. The system of claim 17, wherein the original code page and the translated code page are both stored in page tables.

* * * * *